April 12, 1927.
O. A. FREDERICKSON
ELECTRIC BRACKET OUTLET
Filed Feb. 11, 1924
1,624,547
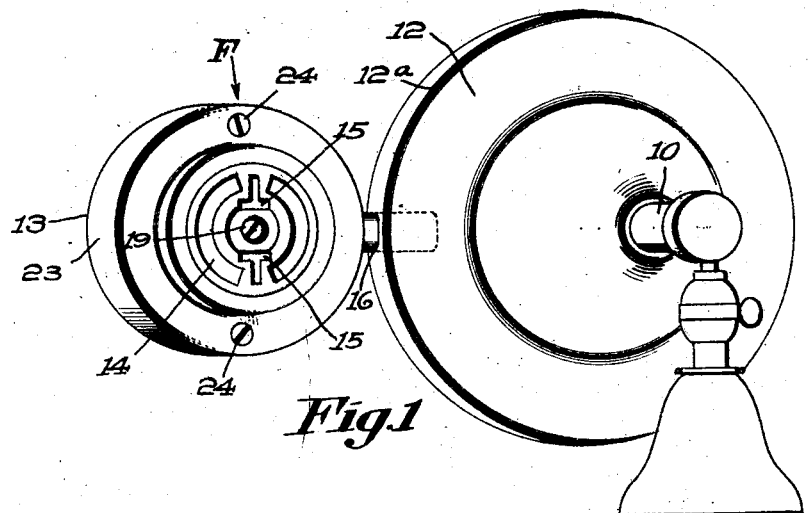
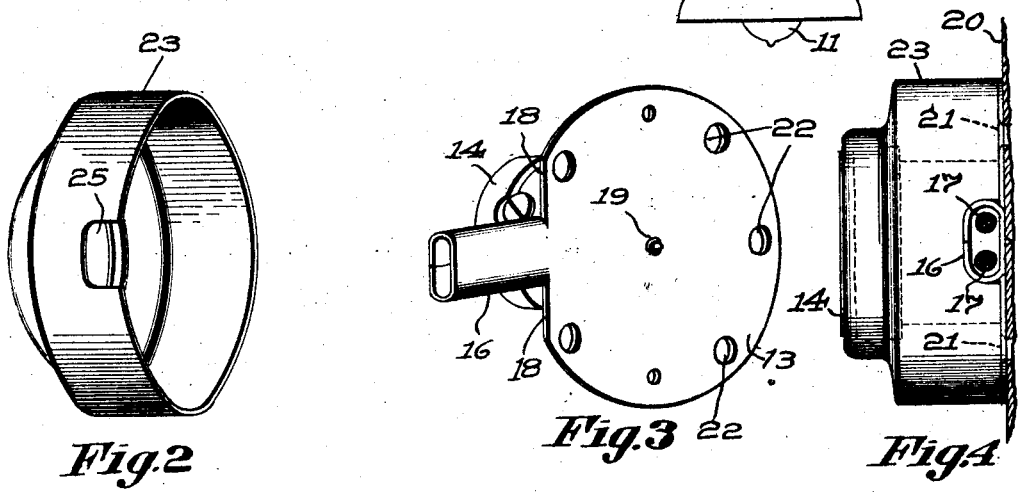
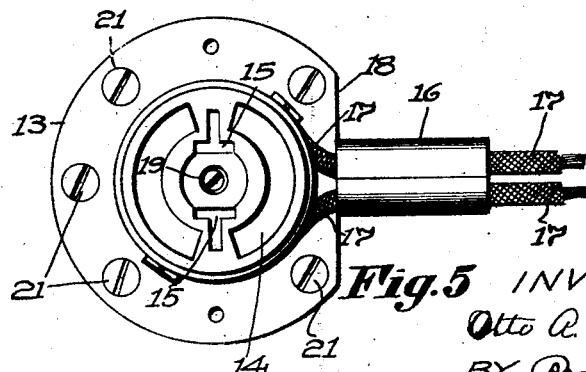
INVENTOR:
Otto A. Frederickson
BY Rob't P. Harris
ATTORNEY Patented Apr. 12, 1927.

1,624,547

UNITED STATES PATENT OFFICE.

OTTO A. FREDERICKSON, OF WETHERSFIELD, CONNECTICUT, ASSIGNOR TO THE AMERICAN WIREMOLD COMPANY, OF HARTFORD, CONNECTICUT, A CORPORATION OF CONNECTICUT.

ELECTRIC-BRACKET OUTLET.

Application filed February 11, 1924. Serial No. 692,012.

This invention relates to an electric fixture adapted to be attached to the ordinary form of electric light wall bracket.

It is often undesirable to attach electrical appliances such as vacuum cleaners, electric irons, extension cords for portable electric lamps, and other like devices, to the ordinary electric lamp socket, because this necessitates the removal of the electric lamp and prevents its use while the electrical appliance is connected to the lamp socket.

The flush type of base board or wall receptacles form a more satisfactory means for supplying current to the various household electrical appliances, but these base board or wall receptacles are not found in all the rooms in which it may be desired to use an electric iron or other electrical appliance, and it is comparatively expensive to install such receptacles after the house has been completed.

Due to the extensive use in the home of various electrical appliances, it is desirable that a simple and inexpensive fixture be provided which may be easily installed adjacent the ordinary electric wall bracket, and the present invention is directed to such an electric fixture or attachment.

The ordinary wall electric light bracket is provided with a canopy which conceals the electric conductors that lead to the electric light socket and these conductors may be readily tapped when an electric attachment is installed, but difficulty has been experienced heretofore in devising a satisfactory construction for leading the conductors out from under the canopy.

The present invention therefore contemplates a receptacle which may be readily secured to a wall of a room adjacent the canopy of an electric light bracket, and the installation of which requires that only a shallow notch be formed in the rear edge of the canopy to receive the protecting tube for the conductors leading to the receptacle.

Various features of the invention will be hereinafter described in connection with the accompanying drawings which illustrate one good practical form thereof.

In the drawings:—

Fig. 1 is a perspective view of a wall bracket having the electric fixture of the present invention installed at one side of the canopy.

Fig. 2 is a perspective view of the outer casing of the electric fixture of the present invention.

Fig. 3 is a perspective view of the base of the fixture, the outer casing being removed.

Fig. 4 is a side view of the complete fixture; and

Fig. 5 is a plan view of the fixture, the cover being removed.

In Fig. 1 of the drawing is shown a sidewall light fixture of usual construction consisting of a bracket 10 supporting the electric light 11, and upon the bracket 10 is mounted the usual canopy 12 which serves to enclose the conductors for the electric light and to give the fixture a finished appearance. The canopies in use usually flare outwardly as shown toward the ring portion 12$^a$ at the base, and a notch may be readily formed in the ring portion 12$^a$ for the passage of conductors, but if the notch is cut deep enough to reach the flared portion of the canopy it spoils the appearance of the same.

The electric fixture or attachment F of the present invention is shown in Fig. 1 as secured to the wall at one side of the canopy 12, and the fixture F consists of a metal base plate 13 to which the receptacle 14 of any well known or preferred construction is secured. The receptacle 14 which is made of nonconducting material is shown as having the openings 15 adapted to receive the prongs of the usual attachment. The construction of the receptacle 14 however may be varied as desired to receive different attachments without departing from the scope of the present invention.

The base plate 13 is conveniently formed of sheet metal and is provided with a tube 16 adapted to extend from the base plate into the canopy 12 to enclose and protect the conductors 17 leading from the wires within the canopy to the receptacle 14. The tube 16 is preferably formed integrally with the base plate 13 and is conveniently constructed by cutting the metal along the lines 18 and then bending upwardly and around the cut metal to form the tube as clearly shown in the drawings.

The fixture F is designed so that it may be readily installed after a house has been wired and the lamp fixtures have been placed in use, and the tube 16 is therefore given the flattened construction shown so that it will be necessary to cut only a shallow notch in the base of the canopy to receive the tube, and since the tube is made of sheet metal its outer diameter will not be much greater in one direction than the diameter of a wire 17. Practically all canopies are made with a ring portion 12ᵃ deep enough to accommodate the tube 16 and it is therefore unnecessary to cut the flared portion of a canopy in installing the present fixture.

The receptacle 14 may be secured to the base plate 13 by a central screw 19, and the base plate may be secured to a wall 20 by screws 21 inserted thru apertures 22 in the base plate. The receptacle 14 is enclosed by a metal cover 23 that is secured to the base plate by screws 24, and a notch 25 is formed in the cover to clear the tube 16. The outer end of the receptacle extends thru an opening in the cover as shown.

From the foregoing it will be seen that the electric fixture F is simple in construction and may be easily installed adjacent the usual electric wall bracket and that due to the flat construction of the tube 16 a shallow notch formed in the canopy will be sufficient to receive the tube.

What is claimed is:

1. An attachment for an electric light fixture having a canopy for concealing the base of the fixture, comprising a plug receiving receptacle having electric conductor wires for connecting it to the electric light conductors within the canopy, a metal base plate to which the receptacle is secured and constructed to be fastened to a wall of the room adjacent the canopy, an enclosing casing for the receptacle, and a tube formed integral with the base plate and constructed to extend thru a shallow notch in the base of the canopy and to completely enclose the portion of the conductor wires extending from the receptacle to the interior of the canopy.

2. An attachment for the type of electric light fixture having a canopy for concealing the base of the fixture, comprising a plug receiving receptacle having electric conductor wires for connecting it to the electric conductors within the canopy, a sheet metal base plate upon which the receptacle is mounted and adapted to be secured to a wall adjacent the canopy and having a portion which is bent to form a laterally extending tube that is constructed to extend through a shallow notch in the base of the canopy, said tube being formed to completely enclose the portion of the conductor wires extending from the receptacle to the interior of the canopy.

3. An attachment for an electric light fixture having a canopy for concealing the base of the fixture, comprising a plug receiving receptacle having electric conductor wires for connecting it to the electric conductors within the canopy, a metal base plate upon which the receptacle is mounted and adapted to be fastened to a wall adjacent the canopy, and a flattened tube formed integral with the base plate and projecting therefrom to extend thru a shallow notch formed in the base of the canopy, and having a cross-sectional area that is just large enough to receive two conductor wires side by side and adapted to protect the portion of the wires extending from the receptacle into the canopy.

In testimony whereof, I have signed my name to this specification.

OTTO A. FREDERICKSON.